June 8, 1965   B. E. ROWELL   3,187,629
MIRROR ARRAY
Filed Aug. 7, 1961   3 Sheets-Sheet 1

BERTHA E. ROWELL
INVENTOR.

ATTORNEY
BY Warren T. Jessup

June 8, 1965
B. E. ROWELL
3,187,629
MIRROR ARRAY
Filed Aug. 7, 1961
3 Sheets-Sheet 2
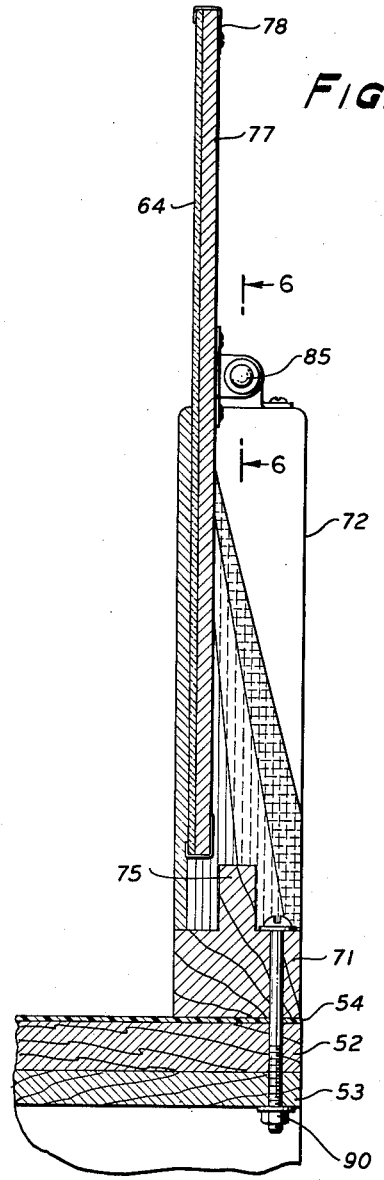
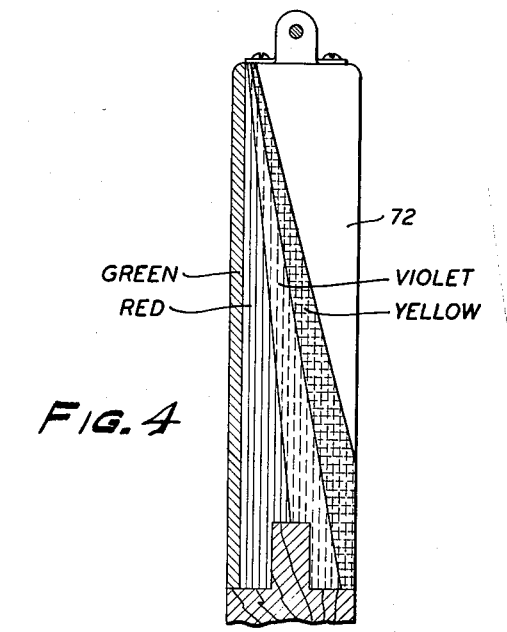
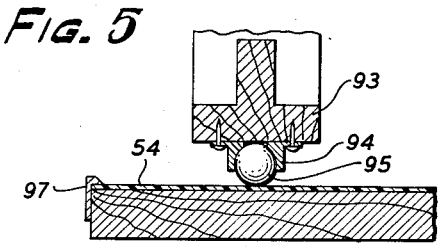
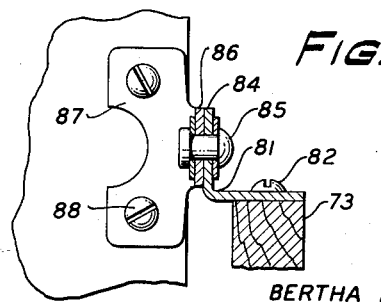
BERTHA E. ROWELL
INVENTOR.
ATTORNEY.
BY Warren T. Jessup June 8, 1965  B. E. ROWELL  3,187,629
MIRROR ARRAY
Filed Aug. 7, 1961  3 Sheets-Sheet 3
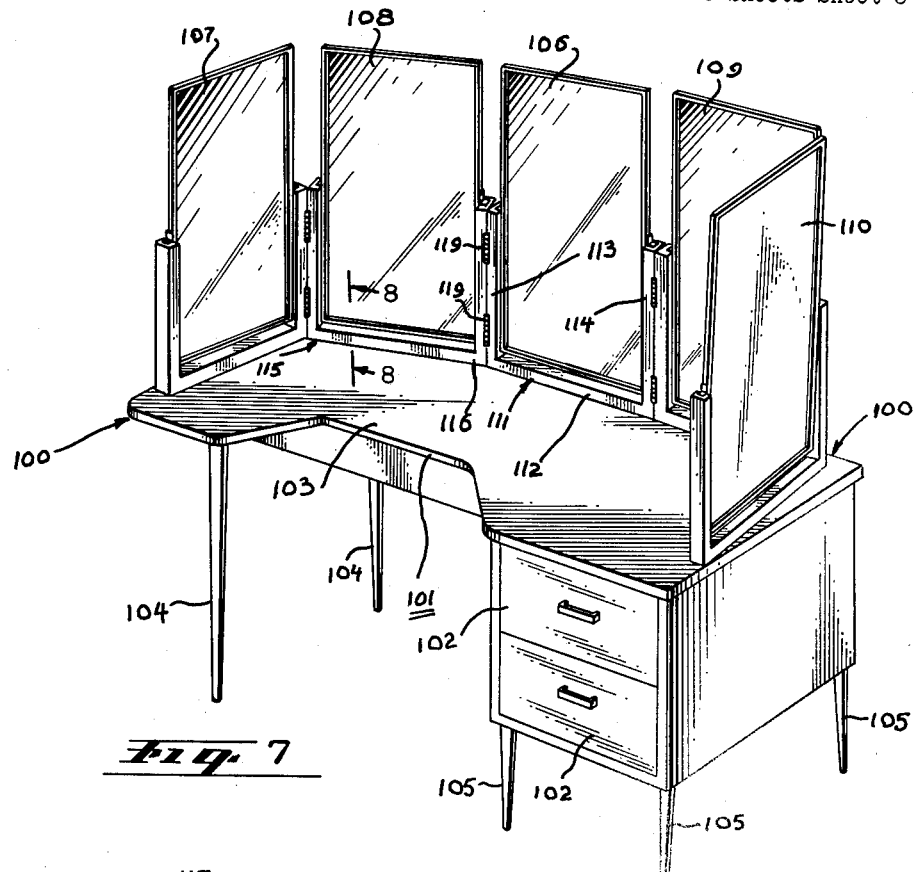
Fig. 7
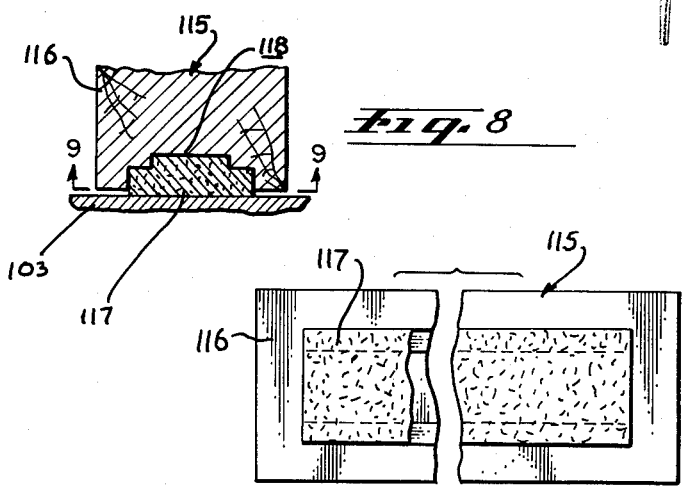
Fig. 8
Fig. 9
INVENTOR.
BERTHA E. ROWELL
BY Warren T. Jessup
ATTORNEY

United States Patent Office 3,187,629
Patented June 8, 1965

3,187,629
MIRROR ARRAY
Bertha E. Rowell, 902 W. Santa Barbara Ave.,
Los Angeles, Calif.
Filed Aug. 7, 1961, Ser. No. 130,459
1 Claim. (Cl. 88—90)

This invention relates to a mirror array and more particularly to an assembly of mirrors which are hingedly joined together to offer a multiplicity of reflected views to the user.

This application is a continuation-in-part of copending application Serial No. 764,923, filed October 2, 1958, in the name of the present inventor, now abandoned.

In the art of hair styling, and hair style analysis, it is imperative that mirrors be used by the operator for viewing the subject; and it is most advantageous for an operator or stylist to be able to see the subject in all possible mirrored views to permit complete visualization and analysis of the structure of the subject's hair and head. It is also desirable that the subject see herself from all angles during the analysis to enable her to more fully understand the analysis.

During the actual operation of styling of the hair, it is also desirable and advantageous to provide the stylist with complete visual encirclement of the head for a more satisfactory operation. Likewise, the subject finds it more interesting and helpful to be able to observe the progress of the styling operation from all angles of vision.

Also, when a subject is considering a change in the color of her hair, or of adopting a transformation, it is highly desirable that she may be able to see herself, from all angles, as she will appear with such a change or transformation. If a change in color is anticipated, a transformation of the color desired is preferably placed on the subject's head to enable her to choose a color which is most suitable. If a transformation is to be fitted, various types and colors of transformations are placed on the head. In either situation, it is advantageous to the operator, and desirable to the subject, to provide means for viewing the effect from all angles.

Frequently it is desirable to photograph a subject before and after the styling, and advantageous to be able to photograph more than one side of the subject at one time, in order to minimize the number of photographs required, and give a more comparative analysis.

In the past, the vision of the operator and/or the subject has been limited to reflection of the subject in a single stationary mirror facing the subject. If the subject desired to see the sides and/or the back of her coiffure, she had to hold a hand mirror, or have it held for her, which has not been satisfactory or efficient, and on the other hand, has been very difficult to accomplish.

It is therefore an object of this invention to provide a new and improved mirror array which provides a plurality of mirrors which can be assembled in such a manner as to be arranged around a subject for reflecting a multiplicity of views on the subject.

It is another object of this invention to provide a new and improved mirror array which provides improved means for precisely adjusting the angular relationship of one mirror to another and the angular relationship between each mirror and the subject to obtain such views.

It is a further object of this invention to provide a new and improved mirror array in which the adjustment of the angular relationship may be easily and readily made with a minimum of adjustment and effort on the part of the subject or the operator.

It is a still further object of this invention to provide a new and improved mirror array of the character described which is economical to manufacture, is easily assembled, and capable of interchangeability of parts.

A further object of the invention is to improve the flexibility and utility of a mirror array comprising mutually hinged mirrors individually mounted for tilting movement wherein the mirrors have support means adapted to be movably adjusted or positioned on the surface of a table.

Another object of the invention is to provide an improvement as in the foregoing object comprising a plurality of mirrors including a central mirror which is secured to a central part of the table surface with hinged mirrors on each side of it relatively adjustable on the surface of the table.

Another object of the invention is to make it possible and convenient to similarly adjust mutually hinged and pivoted mirrors about their horizontal axes by providing corresponding indications inscribed on the inner surfaces of support members at the side edges of the mirrors to indicate corresponding angles of tilt of the mirrors.

Another object of the invention is to provide a mirror arrangement for beauticians which permits the customer to constantly and carefully scrutinize the work being done on her hair, thereby exacting higher caliber work from the beauty operator and raising beautician standards.

Another object of the invention is to make it possible and convenient to obtain similar reflected images on right and left sides of a subject with mutually hinged mirrors pivoted about horizontal axes wherein the array of mirrors is mounted to be adjustably positioned on the surface of a table or the like, the said surface having similar and symmetrical indications inscribed on its left and right sides whereby mirrors on opposite sides can be similarly positioned by positioning the joints between them in corresponding areas on opposite sides defined and determined by the indications.

A general object of this invention is to provide a new and improved mirror array which overcomes disadvantages of prior methods and devices heretofore intended to accomplish generally the same purposes.

These and other objects will be more readily apparent from the following specification and appended claim.

In the drawings:

FIG. 3 is a cross sectional view taken along the line 3—3 of FIG. 1;

FIG. 4 is a view of the inside surface of one of the mirror supporting members;

FIG. 5 is a sectional view taken along the line 5—5 of FIG. 1;

FIG. 6 is a sectional view taken along the line 6—6 of FIG. 3;

FIG. 7 is a perspective view in elevation illustrating a mirror array in accordance with yet another embodiment of the invention;

FIG. 8 is a sectional view taken substantially along the line 8—8 of FIG. 7; and FIG. 9 is a bottom view of one of the mirror frames taken substantially along the line 9—9 of FIG. 8.

Figure 1:
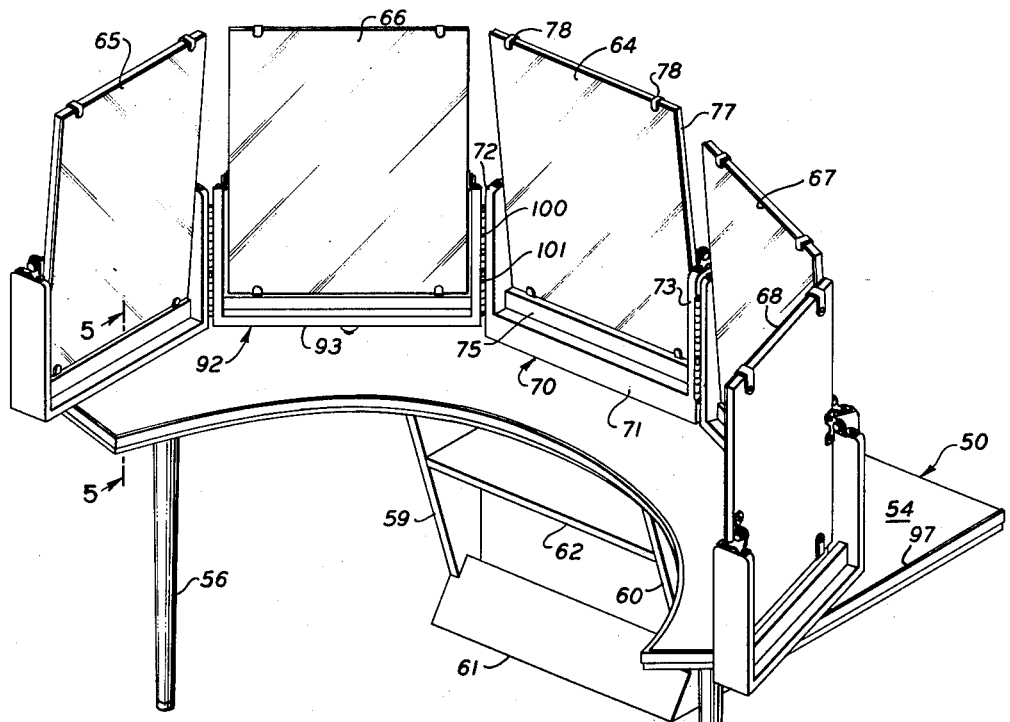
FIG. 1 is a perspective view in elevation illustrating a mirror array in accordance the preferred embodiment of the invention.

Referring to the drawings, these figures show an embodiment of the invention designed to provide flexibility, utility and simplified construction.

Figure 2:
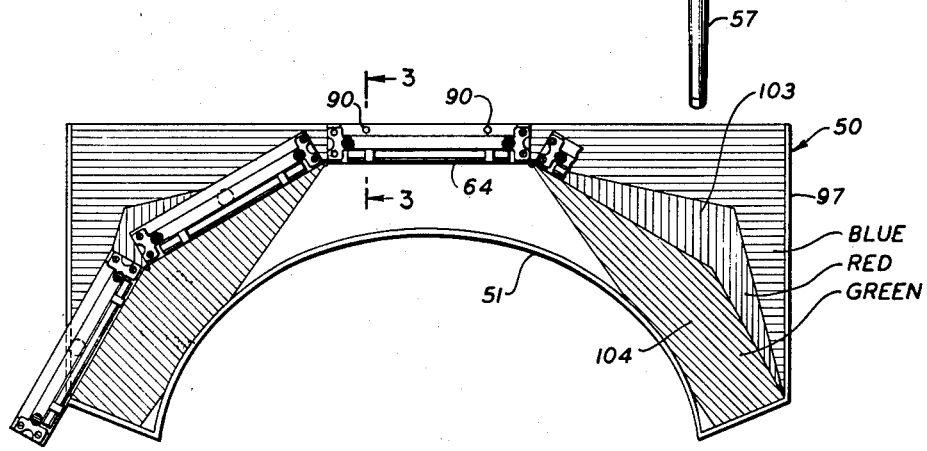
FIG. 2 is a plan view of the mirror array assembly of FIG. 1.

In the form of the invention shown in these figures, the mirror array is mounted on a table as shown at 50. The table has the shape as shown in FIG. 2 having a semi-circular or curved front contour as shown at 51. This enables a person or subject to sit in front of the table with side portions of the table extending out as extensions at the sides of the subject.

The table is of laminated construction as may best be seen in FIG. 3 having laminations 52 and 53 of any suitable material which may be a composition material suitable for table tops. Numeral 54 designates another lamination on the upper surface or top of the table made from an appropriate smooth, hard and pleasing appearing material.

The table has front tapered legs as shown at 56 and 57 and rear legs as shown at 59 and 60. Numeral 61 designates a brace member extending between the lower part of the legs 59 and 60 and numeral 62 designates a shelf positioned between upper or intermediate parts of the legs 59 and 60.

The shelf 62 is under the central part of the table top and is readily accessible to a subject sitting in front of the table.

The mirror array is mounted on the upper surface of the table and comprises by way of example a central mirror 64 and two mirrors on each side of it designated at 65, 66, 67 and 68. The mirror 64 is mounted in a U-shaped support or supporting means 70 having a bottom transverse member 71. The supporting means 70 has upstanding side members 72 and 73 upstanding from the transverse member 71. The transverse member 71 has an intermediate upstanding rib portion as shown at 75. The mirror 64 is pivotally mounted at the upper ends of the side members 72 and 73 so as to be tiltable about a horizontal transverse axis.

The mirror itself is attached to a backing member 77 of the same shape which may be made of the same material for example as the top of the table 50. The mirror itself is attached to the backing member 70 by four metal clips as shown at 78.

At the top of each of the upright members such as 72 and 73 is a bracket as shown at 81 in FIGURE 6 having a horizontal portion attached to the upper end of the upstanding member as by means of a screw 82. Each of the brackets 81 has an upstanding lug 84 which is pivoted by a pivot pin 85 to a similar lug or ear 86 extending at right angles from a bracket 87 which is attached to the backing member 77 of the mirror 64 by screws as shown at 88. The mirror 64 is similarly pivoted at its opposite side.

The transverse member 71 of the supporting means 70 is secured to the top of the table 50 by bolts as shown at 90 in FIGURES 2 and 3.

Each of the mirrors 65, 66, 67 and 68 has support means similar to that described for the mirror 64 except that these mirrors are mounted and supported to be adjustably or movably positioned on the top surface of the table 50. Referring to the mirror 66 its supporting means 92 has the bottom transverse member 93 which is of less vertical extent as may be seen than the transverse member 71 of the supporting means 70.

Attached to the bottom of the transverse member 93 is a socket member 94 as may be seen in FIG. 5 which member has a semi-spherical cavity in it, in which is rotatably disposed a spherical ball 95 which adapts the mirror mounting to roll on the smooth upper surface 54 of the table 50. Each of the other mirrors except the mirror 64 has a similar ball or roller mounting adapting it to be movably positioned or rolled on top of the table 50. The table 50 has a continuous rib around its front and side edges as may be seen at 97 in FIGS. 1, 2 and 5 which serves the purpose of preventing the balls or rollers at the bottom of the mirrors from going off the table when the mirrors are adjusted.

The mirrors are in juxtaposed relationship as is of course apparent and their supporting means are mutually hinged together to provide for relative adjustment between adjacent mirrors about vertical axes. Thus as may be seen, the adjacent upright members of the supporting means 70 and 92 of the mirrors 64 and 66 are hinged together by a piano hinge as designated at 100, thus assuring a firm but flexible joint between the mirrors.

When setting the mirrors to obtain a view of the upper part of a subject's coiffure or the lower part thereof, it is desirable that all of the mirrors be set to the same or a similar angle relative to the vertical. To accomplish this and to provide a group of more or less standard settings of the mirrors, the inside surfaces of all of the upright members such as 72 and 73 have indicia or indications inscribed, painted or otherwise impressed thereon so that the mirrors can be similarly set opposite corresponding indicia or indications. FIGURE 4 shows the inside surface of the upright member 72. As shown, the inside surface is divided into a vertical sector or segment and three angular sectors or segments, each of which is identified by a different color painted on the surface of the member, the colors being as shown, that is, green for the vertical segment, and red, violet and yellow for the angular segments or sectors. As may be seen in FIG. 3, when the mirror is tilted about its transverse axis and brought adjacent a segment of a particular color, the angle of tilt of the mirror is established. In this way, all of the mirrors can be conveniently tilted to correspondingly established angles.

As can readily be understood from the foregoing, the two mirrors on each side of the central mirror 64 can be conveniently adjusted relatively to each other about their hinges and furthermore can be adjusted toward and away from the subject or viewer by movement on the surface of the top of the table 50 and about their hinges connected to the central mirror. In regard to these adjustments about vertical axes, it is also desirable that it be possible and convenient to set up the mirrors on the opposite sides of the central mirror to obtain similar and symmetrical views of each side of the subject. To accomplish this purpose, the upper surface of the table top 50 has indicia or indications inscribed, painted or otherwise applied thereto as indicated by the areas designated blue, red and green and separated by the dividing lines 103 and 104. These color designations are symmetrical on opposite sides of the table, that is, on opposite sides of a center line passing through the center of the mirror 64. When the joints between the two mirrors on each side of the central mirror are set or adjusted to be in corresponding colored areas, the views on each side will be approximately the same angle. These settings can, of course, be combined or integrated with the similar settings of the mirrors about their transverse axes so that more or less standard sets of views can be repeatedly obtained if desired.

Referring to FIGS. 7–9 of the drawings, these figures show a further improved embodiment of the invention which is similar in some respects to the embodiment of FIGS. 1–6.

In the form of the invention shown in FIGS. 7–9, the mirror array is mounted on a table as shown at 100. The table has the shape as shown in FIG. 7 having a recessed front contour as shown at 101. This enables a person or subject to sit in front of the table 100 with side portions of the table extending out as extensions at the sides of the subject. The table 100 is also equipped with drawers 102 at one side of the recessed front contour 101.

The table top 103 may be made of any material suitable for table tops. This material may be a smooth, hard plastic as in the embodiment of FIGS. 1–6, and the table top may have a laminated construction. However, the table top 103 may be composed of any desired material, and it may be constructed in any desired manner.

The table 100 has tapered legs 104 and 105. The legs 104 are relatively long and extend from the table top 103. The legs 105, on the other hand, are relatively short and extend from the bottom drawer 102.

The mirror array is mounted on the upper surface of the table top 103, and it comprises by way of example a central mirror 106 and two mirrors on each side of it designated at 107, 108, 109 and 110. The mirror 106 is mounted in a U-shaped support or supporting means 111 having a bottom transverse member 112. The supporting means 111 has upstanding side members 113 and 114 upstanding from the bottom transverse member 111. The mirror 106 is pivotally mounted at the upper ends of the side members 113 and 114 so as to be tiltable about a horizontal transverse axis.

The transverse member 112 of the supporting means 111 is secured to the table top 103 as by bolts, not shown.

Each of the mirrors 107, 108, 109 and 110 has support means similar to that described for the mirror 106 except that these mirrors are mounted and supported to be adjustable or movably positioned on the table top 50. Referring to the mirror 108 its supporting means 115 has a bottom transverse member 116.

Attached to the bottom of the transverse member 116 is a piece of felt 117 or other similar material. In the illustrated embodiment, the felt piece 117 has a rectangular configuration and it is supported in a cavity 118 in the bottom of the transverse member 116 by means, for example, of a suitable adhesive.

The lower portion of the felt piece 117 protrudes downwardly from the bottom surface of the transverse member 116 and it is adapted to slide along the upper surface of the table top 103 as the mirror 108 is moved.

The mirrors are in juxtaposed relationship as is of course apparent, and their supporting means are mutually hinged together as shown, to provide for relative adjustment between adjacent mirrors about vertical axes. Thus as may be seen, the adjacent upright members of the supporting means 111 and 115 are hinged together by hinges designated at 119, thus assuring a firm but flexible joint between the mirrors.

As can be readily understood from the foregoing, the two mirrors 108 and 109 on each side of the central mirror 106 can be conveniently adjusted relative to each other about their hinges and furthermore can be adjusted toward and away from the subject or viewer by movement on the surface of the table top 103 about their hinges connected to the central mirror.

In like manner, the mirrors 107 and 110 can be conveniently adjusted by movement on the surface of the table top about their hinges. The bottom transverse member of the supporting means for each of the mirrors 107, 108, 109 and 110 is equipped with a felt piece similar to that described above. The felt pieces permits the mirrors to be freely moved about their hinges and across the upper surface of the table top 103. If so desired, only the bottom transverse members of the outer mirrors 107 and 110 may be equipped with the felt pieces.

From the foregoing, those skilled in the art will observe that the herein embodiment of the invention provides convenient and simplified mounting of the mirrors having considerable utility. The arrangement of the mirros for adjustment and movability on the top surface of the table 50 makes it very easy and convenient to obtain desired views and to repeatedly or reproduceably obtain desired more or less standard views. The latter objective is achieved by the simple and effective expedient of the colored indications on the insides of the mirror supporting members and on the table top.

While the instant invention has been shown and described herein in what is conceived to be the most practical and preferred embodiments, it is recognized that departures may be made therefrom within the scope of the invention, which is therefore not to be limited to the details disclosed herein, but it is to be afforded the full scope of the claim.

What is claimed is:

A mirror array comprising in combination, at least three mirrors;
    each mirror mounted in an upwardly opening U-shaped frame having a bottom rail and two side legs extending upwardly substantially half the height of the supported mirror;
    pivot means at the upper end of each of said legs swingably mounting said mirror on said frame;
    said side legs having inscribed on the inside surfaces thereof indications representative of particular angles of tilt of a mirror supported thereby;
        means hinging said frames in a juxtaposition array for relative angular adjustment of the mirrors about vertical axes;
        said bottom rail having a bottom face, a longitudinal channel defined by side walls opening on said bottom face, a glide-pad of felt-like material filling said channel and secured therein, said side walls providing lateral support for said pad to prevent dislodgment,
    said glide pads thereby adapted to support said mirror on surface means providing a smooth flat horizontal surface upon which said felt-like material may slide for angular adjustment of said array.

References Cited by the Examiner

UNITED STATES PATENTS

| | | | |
|---|---|---|---|
| 272,297 | 2/83 | McMurray et al. | 88—84 |
| 1,088,764 | 3/14 | Booth | 88—88 |
| 1,106,503 | 8/14 | Fitchet | 88—84 |
| 1,422,685 | 7/22 | Fitchet | 88—90 |
| 2,175,105 | 10/39 | Bryn | 88—84 |
| 2,184,893 | 12/39 | Lumley | 88—96 |
| 2,473,231 | 6/49 | Wager | 88—84 X |
| 2,664,780 | 1/54 | Waller | 88—84 X |

FOREIGN PATENTS 629,777    8/27    France.

JEWELL H. PEDERSEN, *Primary Examiner.*

FREDERICK M. STRADER, *Examiner.*